United States Patent
Bond et al.

(10) Patent No.: US 6,275,938 B1
(45) Date of Patent: *Aug. 14, 2001

(54) SECURITY ENHANCEMENT FOR UNTRUSTED EXECUTABLE CODE

(75) Inventors: Barry Bond, Renton; Sudeep Bharati, Bellevue, both of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/919,844

(22) Filed: Aug. 28, 1997

(51) Int. Cl.$^7$ .................................................. H01D 13/00
(52) U.S. Cl. ...................... 713/200; 713/202; 713/201; 714/53; 714/55; 714/38
(58) Field of Search ..................... 713/200, 202, 713/201; 714/53, 55, 38; 395/500; 709/202; 711/152, 163, 164

(56) References Cited

U.S. PATENT DOCUMENTS

| | | | |
|---|---|---|---|
| 4,654,799 | * 3/1987 | Ogaki et al. | 364/479 |
| 4,688,169 | * 8/1987 | Joshi | 364/479 |
| 4,796,220 | * 1/1989 | Wolfe | 364/900 |
| 4,982,430 | * 1/1991 | Frezza et al. | 380/50 |
| 5,222,134 | * 6/1993 | Waite et al. | 380/4 |
| 5,390,314 | 2/1995 | Swanson | 395/500 |
| 5,644,709 | 7/1997 | Austin | 395/185.06 |
| 5,805,829 | * 9/1998 | Cohen et al. | 709/202 |
| 5,812,668 | * 9/1998 | Weber | 380/24 |
| 5,842,017 | * 11/1998 | Hookway et al. | 395/707 |
| 5,850,446 | * 12/1998 | Berger et al. | 380/24 |

FOREIGN PATENT DOCUMENTS

| | | |
|---|---|---|
| 0646865 | 4/1995 | (EP) . |
| 0667572 | 8/1995 | (EP) . |
| WO94/07204 | 3/1994 | (WO) . |

OTHER PUBLICATIONS

"New anti–vandal software provides Next Generation PC Protection", *ESafe Technologies, Inc.*, Available from Internet: <IRL: http://www.esafe.com/press/pr032997 .html>, (Apr. 28, 1997).

Hamilton, M.A., "Java and the Shift to Net–centric Computing", *Computer*, 29(8), pp. 31–39, (Aug. 1996).

O'Malley, S., et al., "USC: A Universal Stub Compiler", *Computer Communication Review*, vol. 24, pp. 295–306, (Oct. 1994).

Wei, Y., et al., "The design of a stub generator for heterogeneous RPC Systems", *Journal of Parallel and Distributed Computing*, vol. 11, pp. 188–197, (1991).

* cited by examiner

Primary Examiner—Robert W. Beausoliel, Jr.
Assistant Examiner—Wasseem Hamdan
(74) Attorney, Agent, or Firm—Schwegman, Lundberg, Woessner & Kluth, P.A.

(57) ABSTRACT

Untrusted executable code programs (applets or controls) are written in native, directly executable code. The executable code is loaded into a pre-allocated memory range (sandbox) from which references to outside memory are severely restricted by checks (sniff code) added to the executable code. Conventional application-program interface (API) calls in the untrusted code are replaced with translation-code modules (thunks) that allow the executable code to access the host operating system, while preventing breaches of the host system's security. Static links in the code are replaced by calls to thunk modules. When an API call is made during execution, control transfers to the thunk, which determines whether the API call is one which should be allowed to execute on the operating system.

20 Claims, 4 Drawing Sheets

SECURITY ENHANCEMENT FOR UNTRUSTED EXECUTABLE CODE

FIELD OF THE INVENTION

The present invention relates to electronic data processing and in particular to avoiding system damage from executing programs containing untrusted code.

BACKGROUND OF THE INVENTION

Advances in Internet browsers are creating dynamic and interactive pages on the World Wide Web. However, the advances are also creating increased computer system security risks which may arise from merely viewing a web page. Internet browsers automatically download and run programs or other executable code which are embedded in the web page. The ability to download and execute programs from a remote computer exposes the host computer to several security risks. Hostile programs can, for example, modify a computer system or data on the computer system, steal user data such as passwords and bank-account information, or make system resources unavailable to the user. As a result, security issues are critical in the development of Internet applications.

One prior-art approach provides security for a particular form of executable code, known as Java applets. The executable-code source program is written, downloaded, and converted to platform-independent byte code. The platform-independent tokenized byte code runs on a virtual machine which places strict limits on what the executable code can do. The executable code in the prior-art approach has only very limited access to the operating system. Accordingly, as the Java language becomes more powerful, it must duplicate many functions that the operating system already performs.

ActiveX controls are a form of executable code which avoid the limited abilities of Java. Active® is an outgrowth of two technologies from Microsoft Corp. called OLE (Object Linking and Embedding) and COM (Component Object Model). ActiveX supports features that enable it to take advantage of the Internet. For example, an ActiveX control can be automatically downloaded and executed by a Web browser.

Because ActiveX controls are written in native code, they have full access to the operating system and the process memory in which the controls are running. This access is powerful when the control is running in a tightly controlled environment such as an extension to a stand-alone application. However, full access to the operating system creates serious security issues when ActiveX controls are downloaded from unknown or untrusted sources on the Internet by an application such as the web browser Internet Explorer®. ActiveX controls are designed to access any of the operating system's services. A hostile ActiveX control could search for information on the host system's hard drive, implant a virus, or damage the host system. The problem with the unrestricted access of ActiveX to the operating system is that the unrestricted access places the host system at risk to security breaches.

Accordingly, there is a need for a form of executable code with the ability to access the power of the host operating system, but without compromising the host system's security.

SUMMARY OF THE INVENTION

The present invention implements a security policy for untrusted executable code written in native, directly executable code. The executable code is loaded into a pre-allocated memory range, or sandbox, from which references to outside memory are restricted. Checks ("sniff code") added to the executable code enforces these restrictions during execution. Conventional application-program interface (API) calls in the untrusted code are replaced with translation-code modules ("thunks") that allow the executable code to access the host operating system, while preventing breaches of the host system's security. Static links in the control or applet are replaced by calls to thunk modules. When an API call is made during execution, control transfers to the thunk, which determines whether the API call is one which should be allowed to execute on the operating system or not.

DETAILED DESCRIPTION OF THE INVENTION

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is therefore, not to be taken in a limiting sense, and the scope of the present inventions is defined only by the appended claims. Numbering of the Figures is done so that identical components which appear in multiple figures are identified by the same reference numbers.

Figure 1:
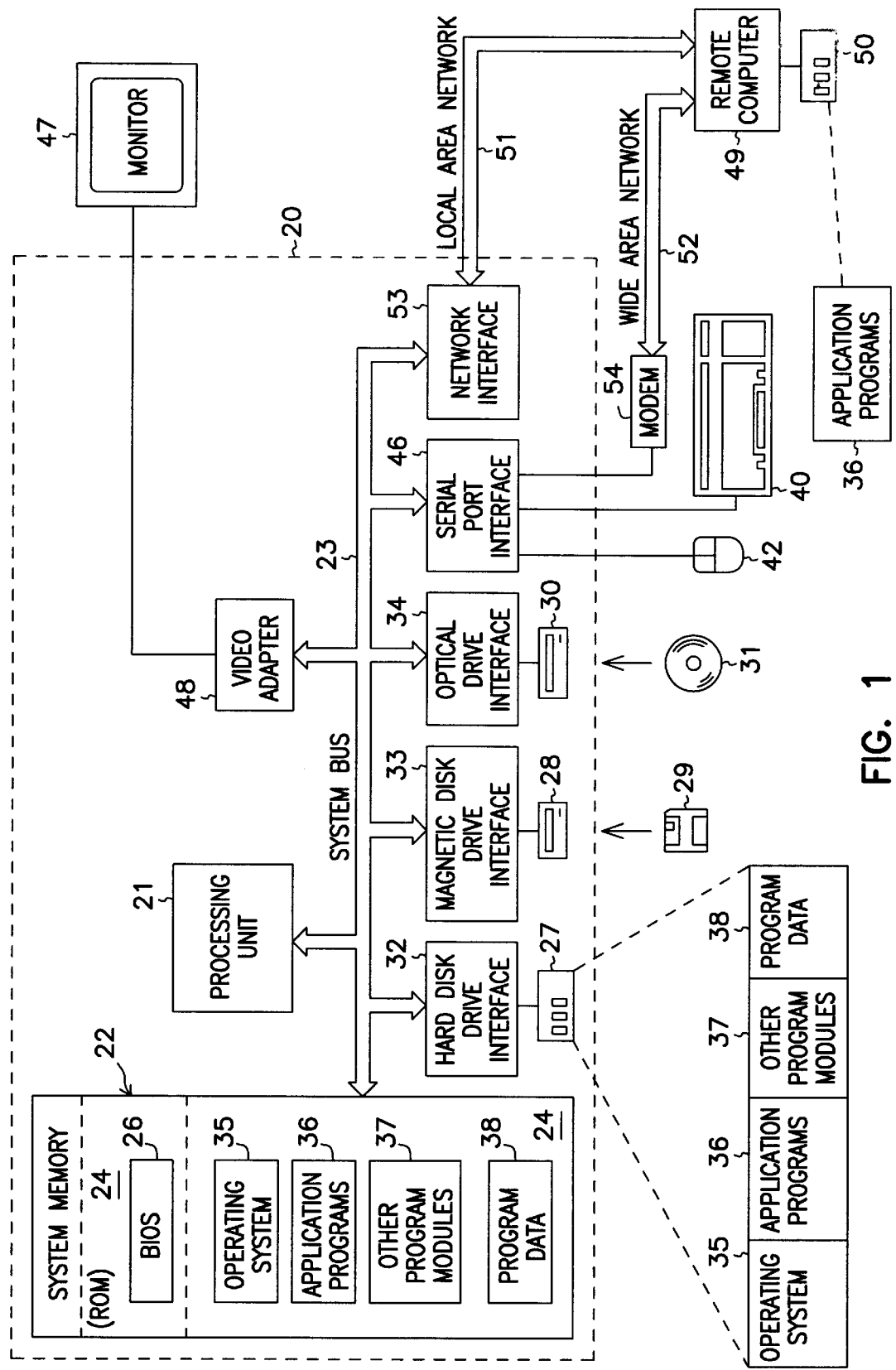
FIG. 1 is a system view of an exemplary computing environment in which the present invention may be implemented.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computes, and the like. The invention may also be practiced in distributed computing environments where tasks are performed by remote processing devices that are linked through a communications network. In a distributed computing environment, program modules may be located in both local and remote memory storage devices.

FIG. 1 provides a brief, general description of a suitable computing environment in which the invention may be implemented. The invention will hereinafter be described in the general context of computer-executable instructions such as program modules, executed by a personal computer (PC); however, other environments are possible. Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows an exemplary system for implementing the invention. It employs a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 24 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules depicted as residing within 20 or portions thereof may be stored in remote storage device 50. Of course, the network connections shown are illustrative, and other means of establishing a communications link between the computers may be substituted.

In the present invention, a conventional web browser running on personal computer 20 as an application program 36 automatically downloads an applet from the remote computer 49. An "applet" is a short program, usually for performing a single function, designed to be executed from within another application. Applets are frequently downloaded from remote computers as they are needed, and may sometimes be erased from the local computer after they have been executed by the primary application.

Figure 2:
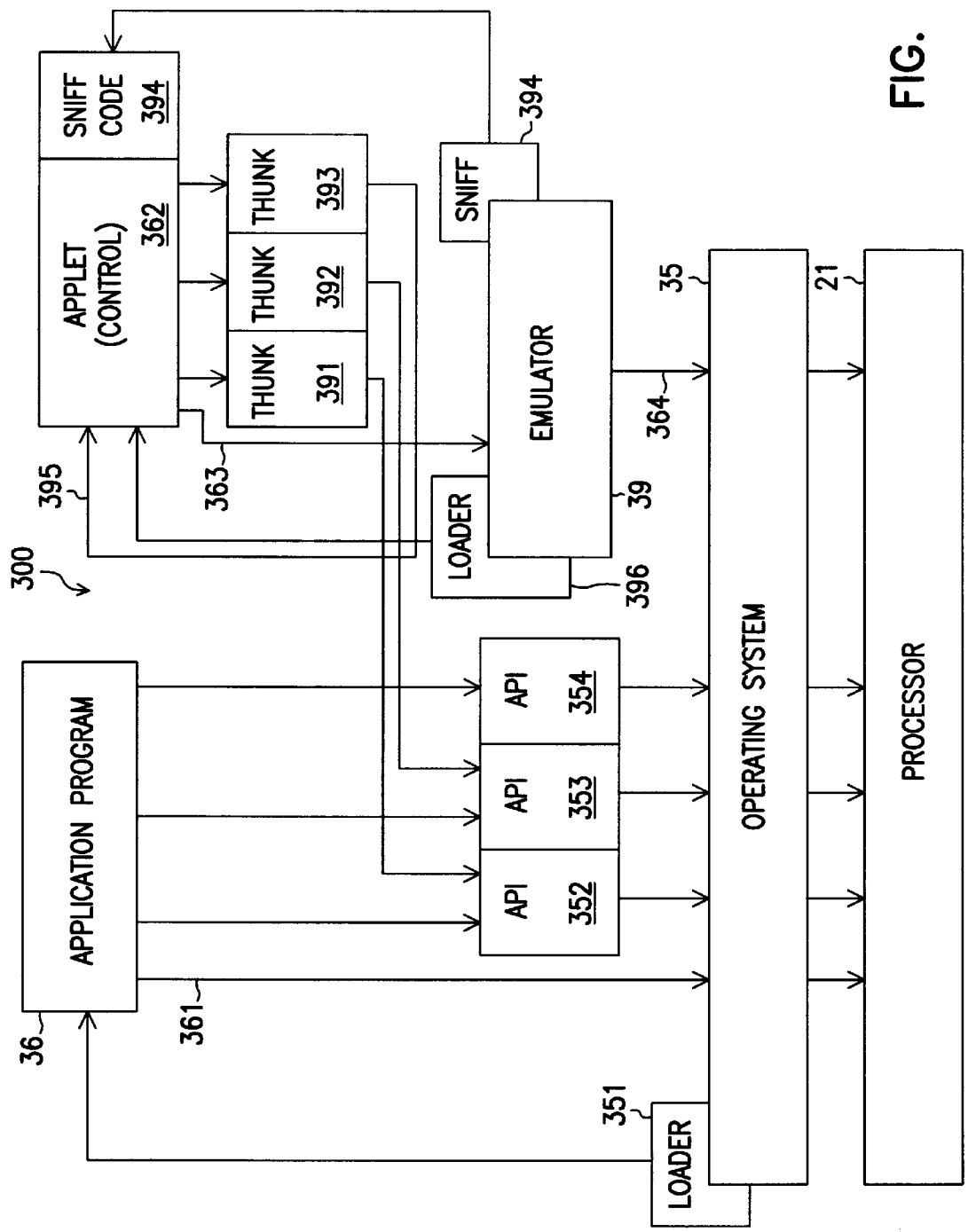
FIG. 2 is a block diagram of an execution environment incorporating the present invention.
Figure 3:
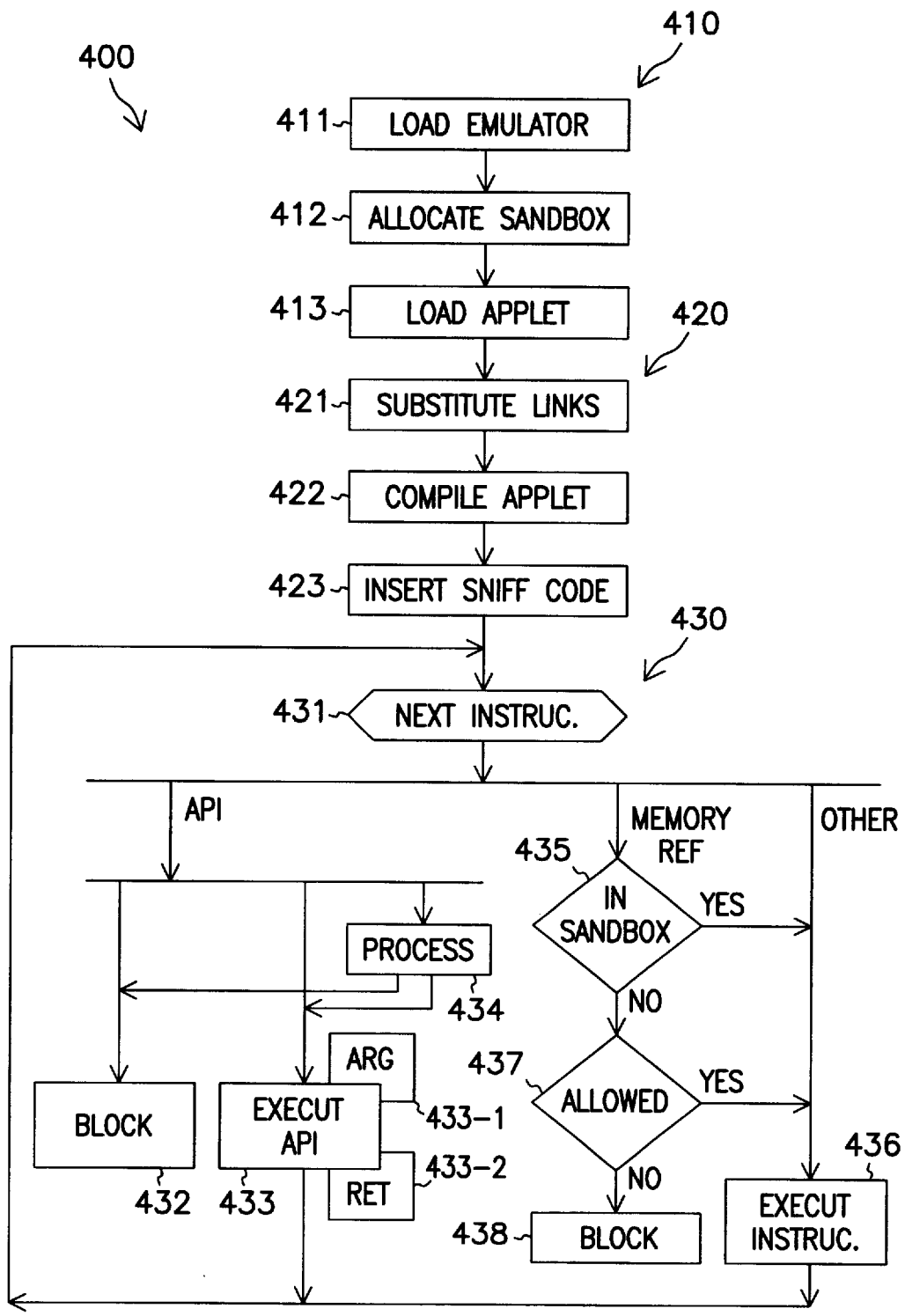
FIG. 3 is a flowchart describing the major steps of the invention.

FIG. 2 shows a mostly conventional execution environment that includes facilities for running applets under the invention. The term "applet" is not precisely defined in the art. This term generally refers to a small program for executing a single function or a limited range of functions; however, the term does not inherently limit the size of the program or its range of functions. Applets are frequently downloaded from an on-line source such as a World Wide Web page for a particular purpose; indeed, an applet may be downloaded, executed immediately, and then purged after execution. In the preferred embodiment described below, the term "control" or "ActiveX control" may be considered synonymous to an applet. In any case, the invention itself is not limited to use with small programs, downloaded programs, or any other specific form of program. The invention is useful for any program which is not "trusted"—that is, a program of uncertain provenance or effects, which might damage the system if it were given full access to system resources.

An operating system 35 such as Windows95 employs a loader module 351 for loading a normal application program 36 into memory. Program 36 executes under the control of OS 35 by sending instructions directly to processing unit 21, as symbolized by line 361. Program 36 executes standard application-program interface (API) functions by calling blocks of API code 352–354. Each API contains instructions directly executable by processor 21 for carrying out a specified low-level function, such as displaying a dialog box on display 47, FIG. 1. OS 35 commonly includes thousands of individual APIs, usually packaged as several dozen dynamic link libraries (DLLs); in the Microsoft Windows NT operating system, these DLLs are collectively known as "Win32".

An emulator program allows application programs written for one processing unit 21 to be executed on another processing unit having a different instruction set. The particular Wx86VM emulator 39 employed here was originally developed for running programs written for Intel "x86" processors (80386, 80486, Pentium, etc.) on processors such as the Digital Equipment Corp. Alpha and the IBM PowerPC. It is described more fully in copending commonly assigned application Ser. No. 08/912,454, filed Aug. 18, 1997, and Ser. No. 08/904,057, filled Jul. 31, 1997. For the present purpose, a somewhat modified version called Wx86VM passes most instructions unmodified to the x88 processor 21, but blocks or translates others as will be described. Wx86VM mimics Wx86 in performing APIs by means of translation modules called "thunk code" (or merely "thunks") 391–393, although the purpose of the thunk codes here is to provide security, rather than their original purpose of allowing API calls from one platform to execute API code written for a different platform.

When an applet such as 362 is to be executed, a host program 36 such as an Internet web browser invokes emulator 39. The emulator employs its own loader module 396 to load the applet code into a predetermined memory area, and to assign another predetermined memory area for its use. These areas are called the "sandbox" for that applet. During execution of the applet, emulator 39 compiles the applet's code in a compiled cache which resides outside the sandbox. During the compilation process, the emulator also inserts the memory sniff code 394 into the cache.

Because applet 362 executes on the same processor platform 21 for which it was written, emulator 39 need not translate individual instructions (symbolized by line 363) in order to execute an ActiveX control. However, it does filter and translate them for the purpose of providing security. For example, APIs use the x86 interrupt (INT) instruction to call the kernel of operating system 35. An INT instruction in a control therefore could bypass the API thunks 391–393 and the sniff code 394, and call the kernel directly. Therefore, emulator 39 blocks this instruction unconditionally; it produces no output code at all on line 364. Other problematic instructions, such as subroutine calls (CALL) and returns (RET), and unconditional/conditional jumps (JMP/Jxx), on line 363 are replaced on line 364 by subroutine calls; when one of these instructions is simulated, the cache of already compiled code must be searched in order to determine the in-cache destination address of the call or jump.

API calls from applet 362 do not proceed directly to API code 352–354. Rather, thunk code 391–393 intercepts them, and decides what to do with them. Some calls, such as at 391, may be passed directly to the corresponding API 352 by thunk 391; these calls cannot wreak any havoc on the system, and thus present no security risks. Other thunks, such as 392, may decide whether or not to pass a call to its corresponding API 353, depending upon certain characteristics of that particular call; or it may modify the call before presenting it to the API. Some thunks, such as 393, completely disallow a call to their API 354; these calls violate the system's security, and cannot be permitted by any untrusted applet 362.

Figure 4:
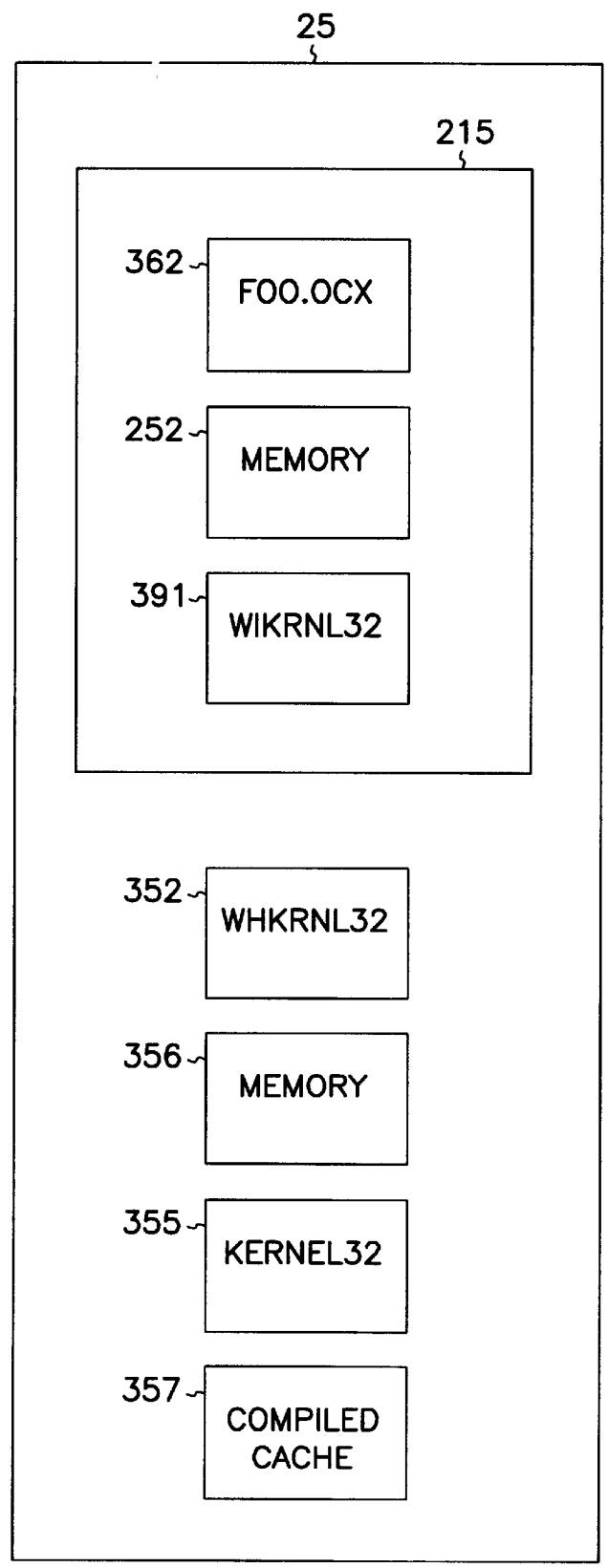
FIG. 4 is a simplified block diagram of a sandbox area in memory.

FIG. 4 illustrates the major steps 400 of one embodiment of the invention that allow applets executed on personal computer 20 to access all of the operating system services without comprising the personal computer's security.

In steps 410, a host application, such as a web browser, loads the applet into an allocated memory range. The allocated memory range is referred to in this application as a sandbox. The sandbox includes both an initial memory segment to store the applet and a run time memory segment for addressable storage during the execution of the applet; these may be assigned in any conventional manner. In this embodiment, OS 35 calls the emulator 39 in step 411. Step 412 allocates an area or range of addresses in RAM 22, FIG. 1, for storing the code of applet 362, and another area for the applet to use as run-time working storage; these two areas together constitute the sandbox in which the applet may safely execute without affecting any other applet, application program, or other facility of the system. There will be one WX86 sandbox for each security domain—that is, all controls having the same security settings play in the same sandbox. Because security settings include a Web page's uniform resource locator (URL), each open Web page has at least one sandbox. Usually, all controls on the same Web page will be in the same sandbox. Although their custom interfaces are not secure, allowing inter-applet calls within a sandbox is acceptable.

Steps 420 prepare an applet for execution.

Step 421 substitutes the applet's static links with links to thunk modules. That is, emulator 39 finds all calls to APIs 352–354 within the code of applet 362 and changes them to calls to the corresponding thunks 391–393. A static link is a link that remains constant during the execution of the applet. A DLL, or Dynamic Link Library, is a library of executable functions or data that can be used by a Windows application. Typically, a DLL provides one or more particular functions and a DLL is accessed by creating either static or dynamic link to the DLL. DLL files in the following description end with the extension .dll. A thunk DLL is a secure API within the sandbox. The thunk DLLs block or restrict many APIs that are not considered safe. For instance, CreateFile will be allowed only in known locations. Similarly, an applet will not be allowed to create another process to record passwords. As described above, some thunks merely pass control to the corresponding API. For example, the Win32 APIs named "CreateWindow", "CreateDialog", "CreateIcon", "CreateCursor", and similar functions do not affect other processes, and can be permitted to untrusted code. On the other hand, certain other APIs must be made entirely unavailable to untrusted code. For example, allowing "CreateProcess" would allow the untrusted applet to run another program outside the sandbox; operations such as "ExitWindowsEx( )" are blocked completely, so that the untrusted code cannot log-off the current user or power-down the computer. A thunk such as 393 blocks an API by returning an error code back to the control, as symbolized by line 395.

Some APIs may be allowed under some conditions, or with certain modifications. In this case, a thunk such as 392 performs internal operations, after which it either calls or blocks the corresponding API 353, or passes modified parameters to the API. For example, "SendMessage( )" normally sends a message to a window. The SendMessage thunk allows an ActiveX control to send any message to windows created by that control. However, the thunk blocks all messages owned by the Web browser or by another application program. This prevents a control from breaching security by sending a WM_CHAR message to simulate a keystroke to be carried out by a window belonging to another program.

Another example involves Win 32 APIs such as "GlobalAlloc", "HeapCreate", which normally allocate memory at any location. The thunks for these APIs incorporate the entire code of the corresponding APIs, recompiled so as to execute entirely within the sandbox memory, and capable of allocating memory only within the bounds of the sandbox.

Although not shown here, it is also possible to have a thunk call a different API than it normally would, or to select among multiple APIs depending upon parameters of the call from the applet.

Step 422 then compiles the applet's code into object code which can be executed by emulator 39, FIG. 2. Compilation may proceed all at once or by parts as code becomes required; compiled code is placed in a compiled cache 357, FIG. 4, located outside the sandbox. Compilation in these ways is conventional, and is not relevant to the invention itself.

Step 423 inserts check code into the applet's own code to enforce prohibitions against disallowed memory references. This check code, called "sniff code", examines all memory reads and writes made by the applet's code, and allows or disallows them from occurring. By preventing the applets from accessing memory outside the sandbox, the security of the applet is increased. Also, providing all the memory to the applet only from the pre-allocated range reduces the sniff-code overhead and results in an efficient check on the memory range. Additional optimization techniques are added by compiling the code on a basic block level. For instance, if several memory references are being made by the applet using the same register, a compiler could check the entire range addressable by that register only once, rather than generating separate calls to the sniff code for each access. Detailed examples will be shown in connection with FIG. 4. Basically, the sniff code allows the applet to reference RAM addresses only within the allocated sandbox and within certain other memory which cannot damage the system. (Although emulator 39 allows no memory references outside the sandbox, it does have the ability to add memory regions to the sandbox. For purposes such as device-independent bitmap images, the extra sniff-code overhead is less than the effort otherwise required to copy the images into the initial sandbox region.)

Steps 430 execute the applet. Step 431 follows the instruction sequence.

If the current instruction is a call to an API, the link placed by step 421 determines whether the call will be blocked completely at step 432, executed at step 433, or processed further at step 434, then either blocked or allowed.

If the current instruction is a memory-reference instruction such as LOAD or STORE, step 435 allows step 436 to execute the instruction if it refers to an address within its sandbox. If not, step 437 determines whether the reference is otherwise allowed. If so, step 435 executes it; otherwise, step 438 blocks the access and returns an error. The sniff code implements these steps. Other X86 instructions are executed directly by step 436. After each instruction, control returns to step 431. Process 400 continues until the host application terminates it.

In some systems, the execution of an API by a block such as 433 may present another security exposure. If an API's argument is a pointer to data in the sandbox, there is a short period between the time that a thunk validates the contents of the memory pointed to, and the actual call to the API. In a multi-threaded applet, another execution thread within the applet could alter the contents of the memory pointed to, and could thereby transmit unvalidated data to the API. To prevent such an attack, block 433-1 performs a "deep copy" of an API's arguments, and block 433-2 deep-copies any return value from the API. More specifically, when step 433 executes an API, step 433-1 first copies all arguments passed to the API from their location within the sandbox to another location outside the sandbox before the API is actually called. Because the applet itself cannot access this copy, the API validates only data which has already been saved. Step 433 then deposits any return values outside the sandbox; after the API completes execution, step 433-2 copies the return value inside the sandbox for the applet's use. Deep copying may be used selectively, if desired.

FIG. 4 is a memory map of system RAM 25 showing only those areas relevant to the invention. The preallocated range 251 forms the sandbox. It contains an initial memory segment for storing an applet 362, a run-time memory segment 252 for addressable working storage during the applet's execution, and a segment for storing the translation-code thunks 391–393 (here shown only as thunk 391). Memory 22 outside of sandbox 251 contains the API DLLs, here represented by 352, and kernel32 355. Other working memory areas are represented as 356. The compiled cache 357 also lies outside sandbox 215. The location of WHKRNL32 352 outside sandbox 215 is especially important, because it is here that the security policy is actually implemented; if it were inside the sandbox, a rogue applet might be able to compromise security by modifying it.

The following example illustrates the operation of the invention. As stated previously, this embodiment utilizes the aforementioned Wx86VM emulator to run x86 Win32 applets or controls unmodified on an x86 platform under the Windows95 or Windows NT operating system.

A web browser such as the Microsoft Internet Explorer downloads an ActiveX control (applet) called foo.ocx from the Internet to the hard drive at c:\temp\foo.ocx. The extension .ocx indicates an ActiveX control.

Internet Explorer then looks for the presence of Wx86VM in the system. If the Wx86VM component is available, Internet Explorer calls it and provides all the security-related information about the control and requests for the control to be loaded. Wx86VM components look at the security information that Internet Explorer has provided it, and decides whether to launch it in the Wx86VM, or to let an object linker, OLE32, handle it.

If the control is to be launched in the Wx86VM emulator, then Wx86VM creates an allocated area of memory, or sandbox, 251 for the ActiveX control. Wx86VM loads the ActiveX control, foo.ocx, (shown as 362 in FIG. 4) into the sandbox.

Wx86VM loads API thunk DLLs (secure APIs) such as 391 into the sandbox. Wx86VM is able to modify the names of DLLs within the operating-system loader, as explained more fully in the aforementioned application Ser. No. 08/904,057. This allows Wx86VM to insert thunk code between the x86 image and the native API, to handle differences in calling conventions. The list of names to remap is stored in a registry. For example, kernel32 (355 in FIG. 4) is remapped to wikrnl32 (shown as thunk 391 in FIG. 4), and user32.dll is remapped to wiuser32.dll. An API thunk is composed of two DLLs: a DLL prefixed by "wi", which runs within the Wx86VM and hence is not trusted, and a DLL prefixed by "wh", which runs outside of the Wx86VM and is trusted to implement saftety policy.

"Wi" DLLs have the same exports as the native DLL that they substitute for. These exports are responsible for switching out of the sandbox to the Wx86.dll, which then calls the appropriate thunk in secure mode; this further implements the security policy for that API. If there is no security concern for a particular API, then the thunk merely calls the native API. This call, called a "BOP", is typically an invalid x86 opcode that signals Wx86.dll that a mode-switch needs to take place. The BOP command has the form "BOP (DLL #, API #)". When Wx86VM dispatches the BOP to the host-side thunk DLL, which is prefixed with "wh" (such as whkrnl32, 352 in FIG. 4), that DLL has access to the sandbox's register set and stack, so the DLL can copy parameters from the sandbox's stack to native stack, validate the API's arguments, make the call, and move the return value back into the sandbox's EAX register.

For example, if an x86 applet or control has a static link to kernel32!CreateFile, Wx86VM resolves that link to wikrnl32!CreateFile. When the applet calls CreateFile, wikrnl32!CreateFile executes a BOP instruction that switches from the sandbox to native, and calls Wx86lDispatchBopo in Wx86VMl.dll. Wx86DispatchBopo dispatches the call to whkrnl32!whCreateFile( ). That function calls native kernel32!CreateFile( ), copies the return value into the simulated EAX register, and returns.

Wx86VM also loads the emulator 39 code, Wx86cpu.dll. During execution of an applet, the emulation halts when the processor encounters a BOP instruction.

Execution of the applet begins by compiling the needed code and putting the code in the compiled cache. The compiled code has sniff checks in it to verify that the memory read or memory write operation is a safe operation. If the memory being accessed is outside the predetermined sandbox area, the operation attempting to access the memory will fail. For example, if the applet foo.ocx contains the instruction MOV EAX,[ESI+4], then the compiler will insert the sniff code before the MOV instruction to verify that the instruction is safe. So the following instruction:

MOV EAX, [ESI+4]

becomes:

LEA ECX, [ESI+4]
CALL SNIFFREAD4.ECX
MOV EAX, [ECX]

after the sniff code has been inserted.

Because sniff code adds an overhead, additional optimization techniques can be applied when compiling the code on a basic block level. For instance, if the applet makes several memory references using the same register, the compiler checks the whole range only once and does not generate separate sniff calls. So if the applet foo.ocx contains the following instructions:

MOV EAX, [ESI+4]
MOV EDX, [ESI+8]

the sniff code will be inserted as:

LEA ECX, [ESI+4]
CALL SNIFFREAD8.ECX
MOV EAX, [ECX]
MOV EDX, [ECX+4]

rather than inserting the sniff code in the less efficient manner:

LEA ECX, [ESI+4]
CALL SNIFFREAD4.ECX
MOV EAX, [ECX]
LEA ECX, [ESI+4]
CALL SNIFFREAD4.ECX
MOV EDX, [ECX]

The above description is illustrative, and not restrictive. Many other embodiments will be apparent to those having skill in the art, upon reviewing the above description. The scope of the invention should therefore be determined with reference to the appended claims, along with the full scope of equivalents to which such claims are entitled.

We claim as our invention:

1. A method for executing an untrusted program written for direct execution on a computer platform having a memory and interface modules, the method comprising:
   allocating a predetermined bounded area of the memory for the untrusted program;
   loading the untrusted program into the bounded memory area;
   placing check code within the untrusted program for blocking references to the memory outside the bounded area;
   replacing links in the code to the interface modules with links to translation-code modules for passing and blocking execution of certain ones of the interface modules;
   executing the untrusted program.

2. The method of claim 1, wherein the bounded memory area further includes an area of working storage for the untrusted program.

3. The method of claim 2, wherein the check code acts upon blocks of memory addresses as a whole.

4. The method of claim 1, wherein a first set of the translation-code modules directly access a corresponding set of the interface modules.

5. The method of claim 4, wherein a second set of the translation-code modules block access to a second corresponding set of the interface modules.

6. A computer-readable storage medium containing thereon computer-executable instructions code for:
   allocating a predetermined bounded area of the memory for storing an untrusted program;
   loading the untrusted program into the bounded memory area;
   placing check code within the untrusted program for blocking references to the memory outside the bounded area;
   replacing links in the code to the interface modules with links to translation-code modules for passing and blocking execution of certain ones of the interface modules.

7. In a computer system having a native processor, a memory, and an operating system executable by the native processor, an emulator for running an untrusted program written in native code directly executable by the native processor and using interface modules of the operating system, the emulator comprising:
   a load module for loading the untrusted program into a bounded area of the memory;
   check code insertable into the untrusted program for limiting accesses by the untrusted program outside the bounded area of the memory;
   a set of translation-code modules linkable to the untrusted program for accessing a corresponding set of the interface modules of the operating system.

8. A method for executing an untrusted program written for direct execution on a native computer platform having a memory and an operating system, the method comprising:
   allocating a predetermined bounded area of the memory for the untrusted program;
   loading the untrusted program code into the bounded memory area;

placing check code from outside the untrusted program within the untrusted program, so as to modify the code of the untrusted program, for blocking references to the memory outside the bounded area.

9. The method of claim 8, further comprising:

allocating a portion of the bounded memory area as runtime working storage for the untrusted program.

10. The method of claim 8, further comprising:

loading a plurality of additional code modules into the bounded memory area, the code modules being accessible to the untrusted program.

11. A method for executing an untrusted program written for direct execution on a native computer platform having a memory and an operating system, the operating system including a set of interface modules linkable by the untrusted program, the method comprising:

constructing a set of translation-code modules corresponding to a predetermined subset of the interface modules, the translating-code modules being capable of passing control to respective ones of the interface modules in the subset;

replacing links in the untrusted-program code to the interface modules with links to corresponding ones of the translation-code modules, so as to allow execution of only certain ones of the interface modules by the untrusted program.

12. The method of claim 11, further comprising:

storing the set of translation-code modules within a bounded area of the memory accessible to the untrusted code.

13. A method of providing security for an applet, the method comprising the steps of:

loading an applet into a pre-allocated memory range, the pre-allocated memory range including both an initial memory segment to store the applet and a run time memory segment for addressable storage during the execution of the applet so that memory access by the applet is limited to the pre-allocated memory range, and substituting each static control link to an unsafe API with a thunk DLL so that an unsafe API call made by the applet is restricted.

14. A method of providing security for an applet, the method comprising the steps of:

loading the applet into a pre-allocated memory range;

substituting each static control link in the applet with a thunk DLL;

executing the applet;

transferring control to a DLL when an API call is made by the applet; and applying predetermined security rules to determine if the API call should be allowed to execute on the operating system thereby providing security for the applet.

15. The method of providing security for the applet in claim 14, where in the pre-allocated memory range of the loading step contains memory for the control run time.

16. The method of providing security for the applet in claim 14, where in the executing step utilizes a sniff code to limit memory access by the control to the pre-allocated memory range.

17. The method of providing security for the applet in claim 16, wherein the sniff code operates on memory blocks in order to improve performance.

18. The method of providing security for the applet in claim 14, further comprising the step of transporting calls outside the pre-allocated memory range utilizing a secure API.

19. The method of providing security for a computer system running a web-based application, the method comprising the steps:

down loading executable code through the web-based application;

determining a source from which the executable code originated; and if the source of the executable code is an untrusted source:
using Wx86VM to load the executable code into a predetermined area of memory; and
using Wx86VM to limit direct access of the executable code to the predetermined area of memory so that the security of the computer system remains unbreached.

20. A computer-readable medium having computer-executable instructions for utilizing Wx86VM to perform the steps comprising:

loading an applet into a pre-allocated memory range, the pre-allocated memory range including both an initial memory segment allocation and a run time memory segment allocation so that memory access by the applet is limited to the pre-allocated memory range, and substituting each static control link in the applet with a thunk DLL so that an unsafe API call is restricted.

* * * * *

UNITED STATES PATENT AND TRADEMARK OFFICE
CERTIFICATE OF CORRECTION

PATENT NO. : 6,275,938 B1
DATED : August 14, 2001
INVENTOR(S) : Bond et al.

It is certified that error appears in the above-identified patent and that said Letters Patent is hereby corrected as shown below:

Column 1,
Lines 36, 40, 41, 43, 50, 53, 54 and 57, "ActiveX" should read -- ActiveX® --

Column 2,
Line 59, "computes" should read -- computers --.

Column 9,
Line 19, each instance should read -- Wx86DispatchBop() --.

Signed and Sealed this

Twenty-eighth Day of December, 2004

JON W. DUDAS
*Director of the United States Patent and Trademark Office*